US012790658B2

(12) United States Patent
Shin et al.

(10) Patent No.: US 12,790,658 B2
(45) Date of Patent: Nov. 10, 2026

(54) NON-ORIENTED ELECTRICAL STEEL SHEET AND METHOD FOR MANUFACTURING SAME

(71) Applicant: Hyundai Steel Company, Incheon (KR)

(72) Inventors: Kyeong Sik Shin, Incheon (KR); Chun Ku Kang, Incheon (KR); Yong Keun Ahn, Incheon (KR)

(73) Assignee: HYUNDAI STEEL COMPANY, Incheon (KR)

( * ) Notice: Subject to any disclaimer, the term of this patent is extended or adjusted under 35 U.S.C. 154(b) by 0 days.

(21) Appl. No.: 18/962,259

(22) Filed: Nov. 27, 2024

(65) Prior Publication Data

US 2025/0092483 A1 Mar. 20, 2025

Related U.S. Application Data

(63) Continuation of application No. PCT/KR2023/007146, filed on May 25, 2023.

(30) Foreign Application Priority Data

May 31, 2022 (KR) ........................ 10-2022-0067155

(51) Int. Cl.
*C21D 9/46* (2006.01)
*B32B 15/01* (2006.01)
(Continued)

(52) U.S. Cl.
CPC .............. *C21D 9/46* (2013.01); *B32B 15/011* (2013.01); *C21D 1/18* (2013.01); *C21D 6/005* (2013.01);
(Continued)

(58) Field of Classification Search
CPC . C21D 9/46; C21D 1/18; C21D 6/005; C21D 6/008; C21D 8/1222; C21D 8/1233;
(Continued)

(56) References Cited

U.S. PATENT DOCUMENTS

2013/0189539 A1 7/2013 Van De Langkruis et al.
2020/0010918 A1 1/2020 Zaizen et al.
(Continued)

FOREIGN PATENT DOCUMENTS

CN 113649413 A 11/2021
EP 3859032 A1 * 8/2021 ............... H01F 1/16
(Continued)

OTHER PUBLICATIONS

Machine Translation, WO-2019117089-A1 (Year: 2019).*
(Continued)

*Primary Examiner* — Michael G Miller
(74) *Attorney, Agent, or Firm* — Fox Rothschild LLP

(57) ABSTRACT

Provided is a method of manufacturing a non-oriented electrical steel sheet, the method including first hot-rolling each of first and second steel materials containing silicon (Si), manganese (Mn), and aluminum (Al), forming a first laminated structure by laminating the first hot-rolled first and second steel materials, forming a second laminated structure by second hot-rolling the first laminated structure, forming a third laminated structure by cold-rolling the second laminated structure, and cold-annealing the third laminated structure.

10 Claims, 5 Drawing Sheets

(51) Int. Cl.

| | |
|---|---|
| ***C21D 1/18*** | (2006.01) |
| ***C21D 6/00*** | (2006.01) |
| ***C21D 8/1216*** | (2026.01) |
| ***C21D 8/1244*** | (2026.01) |
| ***C21D 8/1277*** | (2026.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/14*** | (2006.01) |
| ***H01F 1/147*** | (2006.01) |

(52) U.S. Cl.
CPC ........... *C21D 6/008* (2013.01); *C21D 8/1222* (2013.01); *C21D 8/1233* (2013.01); *C21D 8/1261* (2013.01); *C21D 8/1277* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/14* (2013.01); *H01F 1/14791* (2013.01)

(58) Field of Classification Search
CPC ...... C21D 8/1261; C21D 8/1277; C21D 1/26; C21D 2251/00; C21D 8/1272; B32B 15/011; C22C 38/001; C22C 38/002; C22C 38/004; C22C 38/02; C22C 38/04; C22C 38/06; C22C 38/14; H01F 1/14791; H01F 1/16; H01F 1/147; Y02P 10/20; B23K 20/04
See application file for complete search history.

(56) References Cited

U.S. PATENT DOCUMENTS

| | | | |
|---|---|---|---|
| 2020/0308676 | A1 | 10/2020 | Zaizen et al. |
| 2020/0308678 | A1 | 10/2020 | Namegawa et al. |
| 2021/0134500 | A1 | 5/2021 | Oda et al. |
| 2021/0151229 | A1 | 5/2021 | Oda et al. |
| 2021/0371948 | A1 | 12/2021 | Zaizen et al. |

FOREIGN PATENT DOCUMENTS

| | | | | | |
|---|---|---|---|---|---|
| JP | 2007-056303 | A | | 3/2007 | |
| JP | 2009-194966 | A | | 8/2009 | |
| JP | 2014-501841 | A | | 1/2014 | |
| JP | 2019199643 | A | | 11/2019 | |
| JP | 2020030005 | A | | 2/2020 | |
| KR | 20150001467 | A | | 1/2015 | |
| KR | 10-1633633 | B1 | | 6/2016 | |
| KR | 10-2018-0073307 | A | | 7/2018 | |
| KR | 10-2022-0060313 | A | | 5/2022 | |
| WO | 2018025941 | A1 | | 2/2018 | |
| WO | 2018147044 | A1 | | 8/2018 | |
| WO | 2019117095 | A1 | | 6/2019 | |
| WO | 2019117096 | A1 | | 6/2019 | |
| WO | WO-2019117089 | A1 | * | 6/2019 | ............ C22C 38/60 |

OTHER PUBLICATIONS

Office Action issued Jun. 18, 2024 in corresponding Korean Patent Application No. 10-2022-0067155.
Office Action issued Aug. 5, 2024 in corresponding Korean Patent Application No. 10-2022-0067155.
International Search Report issued Sep. 1, 2023 in corresponding PCT Application No. PCT/KR2023/007146.
Extended European Search Report issued on Jan. 30, 2026 in European Application No. 23816293.7.
Office Action for Japanese Patent Application No. 2024-570501 dated Jun. 26, 2026.

* cited by examiner (a) (b)

(a)

(b)

NON-ORIENTED ELECTRICAL STEEL SHEET AND METHOD FOR MANUFACTURING SAME

CROSS-REFERENCE TO RELATED APPLICATION

This application is a continuation of International Application No. PCT/KR2023/007146 filed on May 25, 2023, which claims priority to and the benefit of Korean Patent Application No. 10-2022-0067155 filed in the Korean Intellectual Property Office on May 31, 2022, the entire contents of both of which applications are incorporated herein by reference herein in their entirety.

FIELD

The present disclosure relates to a non-oriented electrical steel sheet and a method of manufacturing the same, and more particularly, to a non-oriented electrical steel sheet with low core loss at high frequency, and a method of manufacturing the same.

BACKGROUND

Electrical steel sheets may be classified into oriented electrical steel sheets and non-oriented electrical steel sheets depending on their magnetic properties. Oriented electrical steel sheets exhibit excellent magnetic properties particularly in the rolling direction of the steel sheets because they are produced to be easily magnetized in the rolling direction, and thus are mostly used as cores for large, medium, and small-sized transformers which require low core loss and high magnetic permeability. On the contrary, non-oriented electrical steel sheets have uniform magnetic properties regardless of the direction of the steel sheets, and thus are commonly used as core materials for small motors, small power transformers, stabilizers, etc.

SUMMARY

In one aspect, the present disclosure provides a non-oriented electrical steel sheet with low core loss at high frequency, and a method of manufacturing the same.

However, the above description is an example, and the scope of the present disclosure is not limited thereto.

According to an aspect of the present disclosure, there is provided a method of manufacturing a non-oriented electrical steel sheet, the method including first hot-rolling each of first and second steel materials containing silicon (Si), manganese (Mn), and aluminum (Al), forming a first laminated structure by laminating the first hot-rolled first and second steel materials, forming a second laminated structure by second hot-rolling the first laminated structure, forming a third laminated structure by cold-rolling the second laminated structure, and cold-annealing the third laminated structure.

In an aspect, a method of manufacturing a non-oriented electrical steel sheet is provided, the method comprising: a) first hot-rolling each of first and second steel materials containing silicon (Si), manganese (Mn), and aluminum (Al); b) laminating the first hot-rolled first and second steel materials to form a first laminated structure; c) second hot-rolling the first laminated structure to form a second laminated structure; d) cold-rolling the second laminated structure to form a third laminated structure; and e) cold-annealing the third laminated structure.

The methods may further include removing a scale layer formed on surfaces of the first hot-rolled first and second steel materials, after the first hot-rolling and before the forming of the first laminated structure.

The first hot-rolling may include performing roughing under conditions of a slab reheating temperature (SRT) 1000° C. to 1200° C. and a roughing delivery temperature (RDT) 800° C. to 900° C.

The second hot-rolling may include performing hot-rolling under conditions of an SRT 1100° C. to 1200° C., a finishing delivery temperature (FDT) 800° C. to 1000° C., and a coiling temperature (CT) 560° C. to 600° C.

The first hot-rolled first and second steel materials suitably may each have a thickness of 100 mm to 150 mm, the second hot-rolled second laminated structure may have a thickness of 1.6 mm to 2.6 mm, and the cold-rolled third laminated structure may have a thickness of 0.25 mm to 0.60 mm.

The cold-annealing may include performing annealing under conditions of a heating rate 10° C./s or more, an annealing start temperature 900° C. to 1100° C., and a holding time 30 sec. to 90 sec., and performing cooling under a condition of a cooling rate 30° C./s or more.

The first and second steel materials may each include Si 2.8 wt % to 3.8 wt %, Mn more than 0 wt % and not more than 0.5 wt %, Al 0.5 wt % to 1.2 wt %, carbon (C) more than 0 wt % and not more than 0.002 wt %, phosphorus (P) more than 0 wt % and not more than 0.015 wt %, sulfur (S) more than 0 wt % and not more than 0.002 wt %, nitrogen (N) more than 0 wt % and not more than 0.002 wt %, titanium (Ti) more than 0 wt % and not more than 0.002 wt %, and a balance of iron (Fe) and unavoidable impurities.

The cold-annealed third laminated structure may have a core loss ($W_{10/400}$) of 14.0 W/kg or less and a magnetic flux density ($B_{50}$) of 1.6 T or more.

In a further aspect, a non-oriented electrical steel sheet is provided comprising a laminated structure of steel materials containing silicon (Si), manganese (Mn), and aluminum (Al), the laminated structure being formed by laminating first hot-rolled first and second steel materials and then sequentially performing second hot-rolling, cold-rolling, and cold-annealing.

In aspects, the non-oriented electrical steel sheet may include wherein the first and second steel materials each comprise Si: 2.8 wt % to 3.8 wt %, Mn: more than 0 wt % and not more than 0.5 wt %, Al: 0.5 wt % to 1.2 wt %, carbon (C): more than 0 wt % and not more than 0.002 wt %, phosphorus (P): more than 0 wt % and not more than 0.015 wt %, sulfur (S): more than 0 wt % and not more than 0.002 wt %, nitrogen (N): more than 0 wt % and not more than 0.002 wt %, titanium (Ti): more than 0 wt % and not more than 0.002 wt %, and a balance of iron (Fe) and unavoidable impurities.

According to an embodiment of the present disclosure, a method of manufacturing a non-oriented electrical steel sheet with low core loss at high frequency, and a non-oriented electrical steel sheet manufactured using the method may be provided.

However, the scope of the present disclosure is not limited to the above effect.

DETAILED DESCRIPTION

A method of manufacturing a non-oriented electrical steel sheet, according to an embodiment of the present disclosure, will now be described in detail. The terms used herein are appropriately selected in consideration of their functions in the present disclosure, and definitions of these terms should be made based on the whole content of the present specification.

Electrical steel sheets are generally classified into oriented electrical steel sheets and non-oriented electrical steel sheets. Oriented electrical steel sheets are mostly used in stationary machines such as transformers, and non-oriented electrical steel sheets are commonly used in rotating machines such as motors. The properties of electrical steel sheets may be evaluated based on magnetic flux density and core loss. The magnetic flux density is mostly evaluated as $B_{50}$, and the core loss is generally evaluated as $W_{15/50}$ but evaluated as $W_{10/400}$ when high-frequency characteristics are required as in electric vehicles. $B_{50}$ indicates the magnetic flux density at 5000 A/m, $W_{15/50}$ indicates the core loss at 50 Hz and 1.5 T, and $W_{10/400}$ indicates the core loss at 400 Hz and 1.0 T.

Due to regulations aimed at reducing $CO_2$ emissions to combat global warming, existing internal combustion engine vehicles are being rapidly replaced by eco-friendly vehicles (e.g., hybrid electric vehicles (HEVs) and electric vehicles (EVs)), and more particularly, by EVs. As the demand for EVs increases, the energy conversion efficiency of EV drive motors is improving, and thus excellent magnetic properties of motor core materials are required. Non-oriented electrical steel sheets, which are used as motor core materials, serve to convert electrical energy into mechanical energy in rotating machines, and magnetic properties, i.e., low core loss and high magnetic flux density, are critical for energy saving. In particular, non-oriented electrical steel sheets with low core loss at high frequency (e.g., 400 Hz) are required to improve motor efficiency during high-speed operation where energy losses are high. To meet these requirements, non-oriented electrical steel sheet products are being developed by increasing resistivity or reducing material thickness through the addition of elements such as silicon (Si), manganese (Mn), and aluminum (Al). However, when alloying elements such as Si, Mn, and Al increase, the rolling process may not be performed properly to reduce a cold-rolling recovery rate and cause difficulties in thickness reduction, and when the thickness of the electrical steel sheets is reduced, production costs increase and productivity decreases.

The present disclosure invention provides a method of manufacturing a non-oriented electrical steel sheet capable of achieving high magnetic flux density without a preliminary annealing process by laminating two roughed slabs and performing double-layer hot-rolling to cause shear deformation to a middle layer of the steel sheet.

Figure 1:
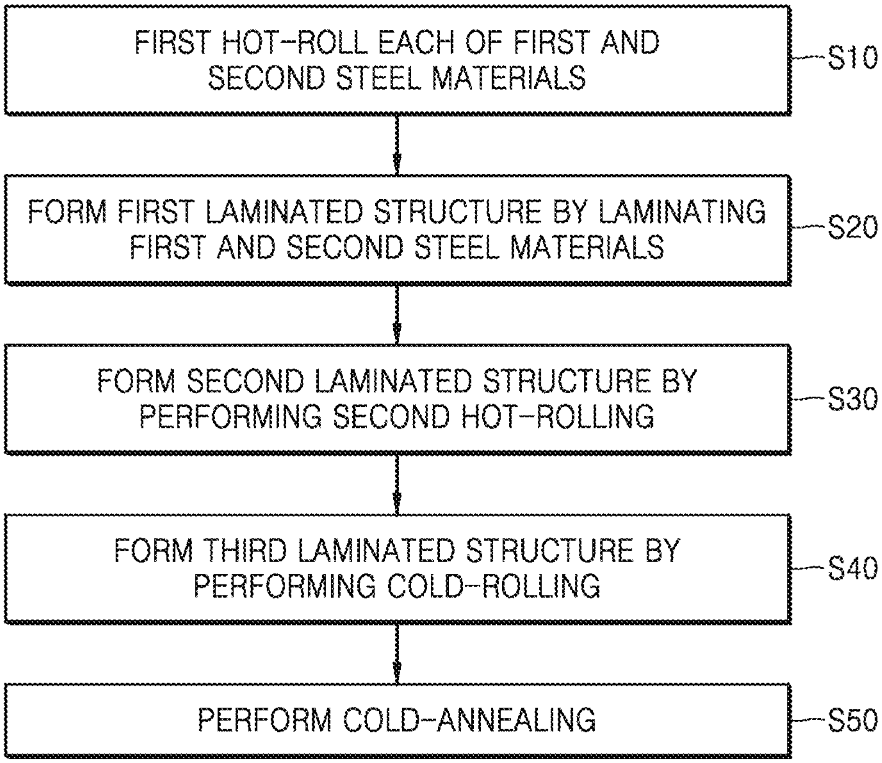
FIG. 1 is a flowchart of a method of manufacturing a non-oriented electrical steel sheet, according to an embodiment of the present disclosure.
Figure 2:
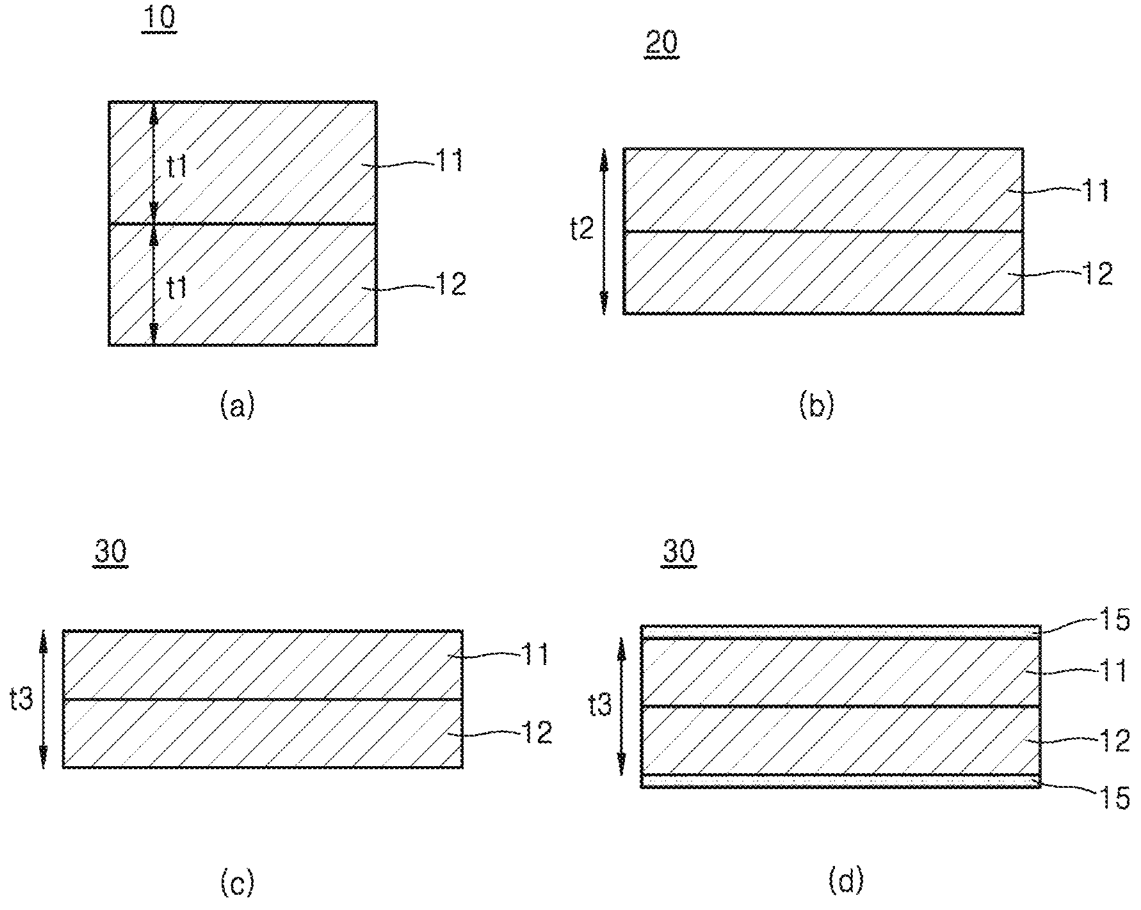
FIG. 2 includes cross-sectional views for describing a method of manufacturing a non-oriented electrical steel sheet, according to an embodiment of the present disclosure.

FIG. 1 is a flowchart of a method of manufacturing a non-oriented electrical steel sheet, according to an embodiment of the present disclosure, and FIG. 2 includes cross-sectional views for describing a method of manufacturing a non-oriented electrical steel sheet, according to an embodiment of the present disclosure.

Referring to FIGS. 1 and 2, the non-oriented electrical steel sheet manufacturing method according to an embodiment of the present disclosure includes first hot-rolling each of first and second steel materials 11 and 12 containing Si, Mn, and Al (S10), forming a first laminated structure 10 by laminating the first hot-rolled first and second steel materials 11 and 12 (S20), forming a second laminated structure 20 by second hot-rolling the first laminated structure 10 (S30), forming a third laminated structure 30 by cold-rolling the second laminated structure 20 (S40), and cold-annealing the third laminated structure 30 (S50).

First Hot-Rolling (S10)

The first and second steel materials 11 and 12 provided for the first hot-rolling process are steel materials for manufacturing a non-oriented electrical steel sheet, and each include, for example, Si: 2.8 wt % to 3.8 wt %, Mn: more than 0 wt % and not more than 0.5 wt %, Al: 0.5 wt % to 1.2 wt %, carbon (C): more than 0 wt % and not more than 0.002 wt %, phosphorus (P): more than 0 wt % and not more than 0.015 wt %, sulfur (S): more than 0 wt % and not more than 0.002 wt %, nitrogen (N): more than 0 wt % and not more than 0.002 wt %, titanium (Ti): more than 0 wt % and not more than 0.002 wt %, and a balance of iron (Fe) and unavoidable impurities.

The functions and contents of example components to which the non-oriented electrical steel sheet manufacturing method according to the technical feature of the present disclosure is applicable will now be described. However, the non-oriented electrical steel sheet manufacturing method according to the technical feature of the present disclosure is not limited to the following example composition, and may be expanded to an arbitrary composition capable of enabling the functions of a non-oriented electrical steel sheet.

Si: 2.8 wt % to 3.8 wt %

Si is a major element added as a component for increasing resistivity and reducing core loss (or eddy current loss). When the content of Si is less than 2.8 wt %, a desired low core loss value at high frequency is not easily achieved, and when the content increases, magnetic permeability and magnetic flux density decrease. When the content of Si is greater than 3.8 wt %, brittleness increases to make cold-rolling difficult and reduce productivity.

Mn: More than 0 wt % and not More than 0.5 wt %

Mn increases resistivity together with Si and improves texture. When Mn is added more than 0.5 wt %, coarse MnS precipitates are formed to deteriorate magnetic properties, e.g., a decrease in magnetic flux density. Furthermore, when the content of Mn is greater than 0.5 wt %, the decrease in core loss is small compared to the amount added, and cold-rollability significantly deteriorates. Because fine MnS precipitates may be formed and grain growth may be suppressed when the content of Mn is less than 0.2 wt %, the composition of Mn may be more strictly controlled to 0.2 wt % to 0.5 wt %.

Al: 0.5 wt % to 1.2 wt %

Al is a major element added as a component for increasing resistivity and reducing core loss (or eddy current loss)

together with Si. Al serves to reduce magnetic deviation by reducing magnetic anisotropy. Al induces AlN precipitation when combined with N. When the content of Al is less than 0.5 wt %, the above-described effect may not be easily expected and fine nitrides may be formed to increase the deviation in magnetic properties, and when the content of Al is greater than 1.2 wt %, cold-rollability deteriorates, and nitrides are excessively formed to reduce magnetic flux density and deteriorate magnetic properties.

C: More than 0 wt % and not More than 0.002 wt %

C is an element for forming carbides such as TiC and NbC to increase core loss, and the less the better. The content of C is limited to 0.002 wt % or less. When the content of C is greater than 0.002 wt %, magnetic aging occurs to deteriorate magnetic properties, and when the content of C is 0.002 wt % or less, magnetic aging is suppressed.

P: More than 0 wt % and not More than 0.015 wt %

P is a grain boundary segregation element and an element for developing texture. When the content of P is greater than 0.015 wt %, grain growth is suppressed, magnetic properties deteriorate, and cold-rollability is reduced due to the segregation effect.

S: More than 0 wt % and not More than 0.002 wt %

S forms precipitates such as MnS and CuS to increase core loss, and suppresses grain growth, and thus the less the better. The content of S is limited to 0.002 wt % or less. When the content of S is greater than 0.002 wt %, core loss increases.

N: More than 0 wt % and not More than 0.002 wt %

N forms precipitates such as AlN, TiN, and NbN to increase core loss, and suppresses grain growth, and thus the less the better. The content of N is limited to 0.002 wt % or less. When the content of N is greater than 0.002 wt %, core loss increases.

Ti: More than 0 wt % and not More than 0.002 wt %

Ti forms fine precipitates such as TiC and TiN and suppresses grain growth. Ti deteriorates magnetic properties, and thus the less the better. The content of Ti is limited to 0.002 wt % or less. When the content of Ti is greater than 0.002 wt %, magnetic properties deteriorate.

The first and second steel materials 11 and 12 having the above-described composition are each subjected to first hot-rolling. The first hot-rolling (S10) is a roughing step and may include performing hot-rolling under conditions of a slab reheating temperature (SRT): 1000° C. to 1200° C. and a roughing delivery temperature (RDT): 800° C. to 900° C.

When the SRT is higher than 1200° C., precipitates such as C, S, and N in the slab may be redissolved and fine precipitates may occur in subsequent rolling and annealing processes to suppress grain growth and deteriorate magnetic properties. When the SRT is lower than 1000° C., rolling load may increase and the final product may have high core loss.

The first hot-rolling of the first and second steel materials 11 and 12 (S10) includes, for example, forming bars each having a thickness of 100 mm to 150 mm by hot-roughing slabs each having a thickness of 200 mm to 300 mm at a reduction ratio of 50% to 65%.

Forming First Laminated Structure (S20)

Referring to (a) of FIG. 2, the first laminated structure 10 may be formed by laminating the first hot-rolled first and second steel materials 11 and 12. The first and second steel materials 11 and 12 constituting the first laminated structure 10 may each have a thickness t1 of, for example, 100 mm to 150 mm.

A scale layer formed on the surface of the first hot-rolled first and/or second steel material 11 and/or 12 may be removed after the first hot-rolling S10 and before the forming of the first laminated structure (S20). The scale layer may include an oxide layer formed on the surface of the first and/or second steel material 11 and/or 12 when the first and/or second steel material 11 and/or 12 is first hot-rolled.

Because the forming of the first laminated structure (S20) is performed after removing the scale layer, the interface between the first and second steel materials 11 and 12 constituting the first laminated structure 10 may be an interface where steel materials from which the oxide layer is removed are in contact with each other.

Forming Second Laminated Structure by Performing Second Hot-Rolling (S30)

Referring to (b) of FIG. 2, the second laminated structure 20 may be formed by second hot-rolling the first laminated structure 10.

The second hot-rolling (S30) may include performing hot-rolling under conditions of an SRT: 1100° C. to 1200° C., a finishing delivery temperature (FDT): 800° C. to 1000° C., and a coiling temperature (CT): 560° C. to 600° C.

The second hot-rolling (S30) may include forming the second laminated structure 20 by rolling the first laminated structure 10 to a thickness t2 of 1.6 mm to 2.6 mm (S30).

Figure 3:
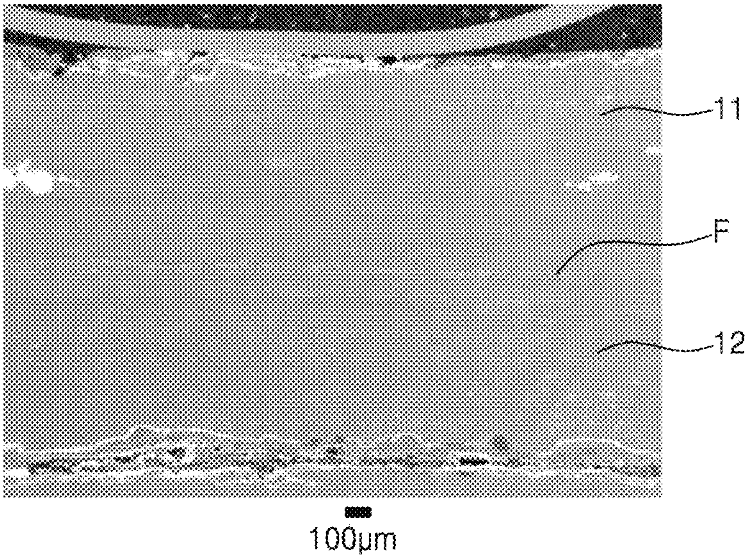
FIG. 3 is a cross-sectional scanning electron microscopic (SEM) image of a second laminated structure after second hot-rolling in a method of manufacturing a non-oriented electrical steel sheet, according to an embodiment of the present disclosure.

FIG. 3 is a cross-sectional scanning electron microscopic (SEM) image of a second laminated structure after second hot-rolling in a method of manufacturing a non-oriented electrical steel sheet, according to an embodiment of the present disclosure.

Referring to FIG. 3, an interface F between the first and second steel materials 11 and 12 constituting the second laminated structure 20 shows that the first and second steel materials 11 and 12 are joined together after the second hot-rolling.

Meanwhile, when double-layer hot-rolling is performed as described above, because shear deformation is caused to the inside of the laminated structure and driving force for dynamic recrystallization is sufficient, a recrystallized hot-rolled structure is exhibited after hot-rolling and thus no preliminary annealing process is required before cold-rolling.

Forming Third Laminated Structure by Performing Cold-Rolling (S40)

Referring to (c) of FIG. 2, the third laminated structure 30 may be formed by cold-rolling the second laminated structure 20.

The cold-rolling may include forming the third laminated structure 30 by rolling the second laminated structure 20 to a thickness t3 of 0.25 mm to 0.60 mm (S40). A reduction ratio of the cold-rolling may be 60% to 82%.

Cold-Annealing (S50)

The third laminated structure 30 may be cold-annealed. The cold-annealing (S60) may include performing annealing under conditions of a heating rate: 10° C./s or more, an annealing temperature: 900° C. to 1100° C., and a holding time: 30 sec. to 90 sec., and performing cooling under a condition of a cooling rate: 30° C./s or more.

The cold-annealing is performed with the cold-rolled steel sheet obtained after the cold-rolling. A temperature capable of achieving an optimal grain size is applied in consideration of core loss reduction and mechanical properties. In the cold-annealing, heating is performed under a mixed atmosphere condition to prevent surface oxidation and nitrification. The surface is further smoothened with a mixed atmosphere of nitrogen and hydrogen. When the cold-annealing temperature is lower than 900° C., fine grains may be formed to increase hysteresis loss, and when the cold-annealing temperature is higher than 1100° C., coarse grains may be formed to increase eddy current loss.

Referring to (d) of FIG. 2, a coating process may be performed to form an insulating coating layer 15 after the final annealing. By forming the insulating coating layer 15, punchability may be improved and insulation may be ensured. The insulating coating layer 15 formed on the third laminated structure 30 may have a thickness of about 1 μm to 2 μm, and the insulating coating layer 15 formed under the third laminated structure 30 may also have a thickness of about 1 μm to 2 μm.

The laminated structure may have a final thickness of 0.25 mm to 0.6 mm, a core loss ($W_{10/400}$) of 14.0 W/kg or less, and a magnetic flux density ($B_{50}$) of 1.6 T or more, and more strictly, 1.65 T or more.

A non-oriented electrical steel sheet manufactured using the above-described method includes a laminated structure of steel materials containing Si, Mn, and Al, the laminated structure being formed by laminating first hot-rolled first and second steel materials and then sequentially performing second hot-rolling, cold-rolling, and cold-annealing.

The first and second steel materials may each include Si: 2.8 wt % to 3.8 wt %, Mn: more than 0 wt % and not more than 0.5 wt %, Al: 0.5 wt % to 1.2 wt %, C: more than 0 wt % and not more than 0.002 wt %, P: more than 0 wt % and not more than 0.015 wt %, S: more than 0 wt % and not more than 0.002 wt %, N: more than 0 wt % and not more than 0.002 wt %, Ti: more than 0 wt % and not more than 0.002 wt %, and a balance of Fe and unavoidable impurities.

According to the present disclosure, a non-oriented electrical steel sheet with a core loss value similar to or a magnetic flux density higher than that of a product produced through a general process (including single-layer hot-rolling and preliminary annealing) at the same thickness. That is, because shear deformation is applied to the inside due to the asymmetric rolling effect of double-layer hot-rolling, low core loss at high frequency may be ensured without a preliminary annealing process through double-layer hot-rolling. Furthermore, because the preliminary annealing process may be omitted, the increase in production costs may be suppressed. The process of manufacturing a double-layer product may be simplified compared to existing methods, and a non-oriented electrical steel sheet with a core loss value similar to and a magnetic flux density higher than those of a product produced through a general process (single-layer hot-rolling and preliminary annealing) may be manufactured.

Test Examples

Test examples will now be described for better understanding of the present invention. However, the following test examples are merely to promote understanding of the present invention, and the present invention is not limited to thereto.

1. Composition of Samples

The present test examples provide samples with the alloying element composition (unit: wt %) of Table 1.

TABLE 1

| Si | Mn | Al | C | P | S | N | Ti | Fe |
|---|---|---|---|---|---|---|---|---|
| 3.3 | 0.2 | 1.2 | 0.0018 | 0.0055 | 0.0011 | 0.0019 | 0.0020 | Bal. |

Referring to Table 1, the composition of non-oriented electrical steel sheets according to the test examples satisfy Si: 2.8 wt % to 3.8 wt %, Mn: more than 0 wt % and not more than 0.5 wt %, Al: 0.5 wt % to 1.2 wt %, C: more than 0 wt % and not more than 0.002 wt %, P: more than 0 wt % and not more than 0.015 wt %, S: more than 0 wt % and not more than 0.002 wt %, N: more than 0 wt % and not more than 0.002 wt %, Ti: more than 0 wt % and not more than 0.002 wt %, and a balance of Fe.

2. Process Conditions and Property Evaluation

Table 2 shows process conditions, core losses, and magnetic flux densities of the present test examples.

Among hot-rolling methods shown in Table 2, the double-layer hot-rolling item indicates a method of sequentially performing the first hot-rolling and the second hot-rolling included in the non-oriented electrical steel sheet manufacturing method according to an embodiment of the present invention described above with reference to FIGS. 1 and 2, and the single-layer hot-rolling item indicates a method of performing hot-rolling on a single slab as in an existing method without adopting a laminated structure. The hot-rolled thickness item indicates the thickness of a rolled steel sheet after final hot-rolling is performed. The APL application item indicates whether a preliminary annealing process (e.g., an annealing and pickling line (APL)) is applied after hot-rolling and before cold-rolling, and the preliminary annealing process may include performing annealing under conditions of a heating rate: 10° C./s or more, an annealing temperature: 900° C. to 1100° C., and a holding time: 30 sec. to 90 sec., and performing cooling under a condition of a cooling rate: 30° C./s or more. The preliminary annealing process is applied only to Test Example 2. The final thickness item indicates the thickness of a rolled steel sheet after cold-rolling. The annealing temperature item indicates the temperature at cold-annealing after cold-rolling. The cold-annealing includes performing annealing under conditions of a heating rate: 10° C./s or more, an annealing start temperature: 900° C. to 1100° C., and a holding time: 30 sec. to 90 sec., and performing cooling under a condition of a cooling rate: 30° C./s or more.

TABLE 2

| | Hot-Rolling Method | Hot-Rolled Thickness (mm) | APL Application | Cold-Rolling Reduction Ratio (%) | Final Thickness (mm) | Annealing Temperature (° C.) | Core Loss $W_{10/400}$ (W/kg) | Magnetic Flux Density $B_{50}$ (T) |
|---|---|---|---|---|---|---|---|---|
| Test Example 1 | single-layer hot-rolling | 2.0 | X | 87.5 | 0.25 | 1000 | 14.24 | 1.64 |
| Test Example 2 | single-layer hot-rolling | 2.0 | ○ | 87.5 | 0.25 | 1000 | 13.27 | 1.69 |
| Test Example 3 | double-layer hot-rolling | 2.0 | X | 87.5 | 0.25 | 1000 | 13.28 | 1.69 |

TABLE 2-continued

| | Hot-Rolling Method | Hot-Rolled Thickness (mm) | APL Application | Cold-Rolling Reduction Ratio (%) | Final Thickness (mm) | Annealing Temperature (° C.) | Core Loss $W_{10/400}$ (W/kg) | Magnetic Flux Density $B_{50}$ (T) |
|---|---|---|---|---|---|---|---|---|
| Test Example 4 | single-layer hot-rolling | 2.0 | X | 87.5 | 0.25 | 950 | 14.48 | 1.63 |
| Test Example 5 | double-layer hot-rolling | 2.0 | X | 87.5 | 0.25 | 950 | 13.41 | 1.69 |

Referring to Table 2, Test Examples 1 and 4 where preliminary annealing of a single-layer hot-rolled steel sheet is omitted exhibit core loss ($W_{10/400}$) values higher than 14.0 W/kg. On the contrary, Test Example 2 where preliminary annealing is performed on a single-layer hot-rolled steel sheet exhibits a core loss ($W_{10/400}$) value of 14.0 W/kg or less. Test Examples 3 and 5 where double-layer hot-rolling is performed but preliminary annealing is omitted based on the non-oriented electrical steel sheet manufacturing method according to an embodiment of the present invention described above with reference to FIGS. 1 and 2 exhibit core losses ($W_{10/400}$) of 14.0 W/kg or less and magnetic flux densities ($B_{50}$) of 1.6 T or more (and more strictly, 1.65 T or more). In particular, the reason why the magnetic flux density is increased compared to Test Examples 1 and 4 where preliminary annealing is omitted is that the asymmetric rolling effect occurs due to the double-layer hot-rolling process and shear deformation is applied to the internal structure of the hot-rolled steel sheet to increase the magnetic flux density through dynamic recrystallization.

According to Test Examples 3 and 5, it is shown that a method of manufacturing a non-oriented electrical steel sheet capable of achieving high magnetic flux density without a preliminary annealing process by laminating two roughed slabs and performing double-layer hot-rolling to cause shear deformation to a middle layer of the steel sheet may be implemented.

Figure 4:
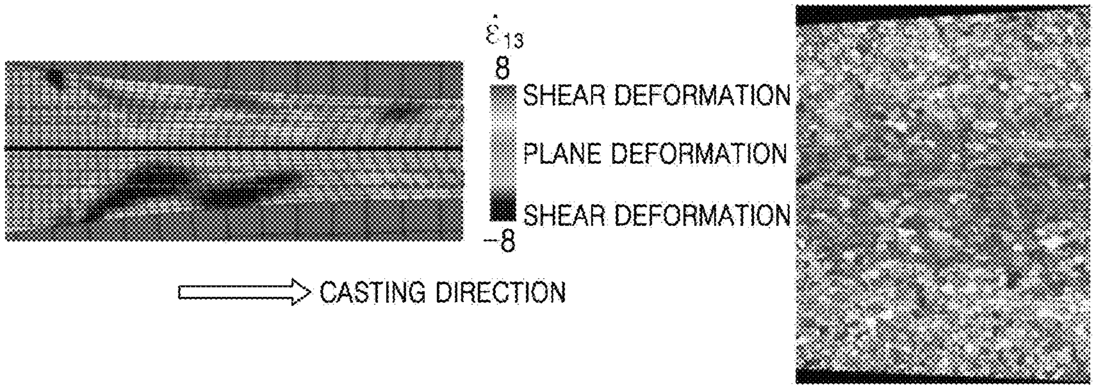
FIG. 4 includes microscopic images of a hot-rolled structure after hot-rolling in Test Example 2 using a method of manufacturing a non-oriented electrical steel sheet, according to an embodiment of the present disclosure.

FIG. 4 includes microscopic images of a hot-rolled structure after hot-rolling in Test Example 2 using a method of manufacturing a non-oriented electrical steel sheet, according to an embodiment of the present invention. (A) of FIG. 4 is a microscopic image of the hot-rolled structure on a cross-section of the steel sheet cut along a length direction parallel to a casting direction, and (b) of FIG. 4 is a microscopic image of the hot-rolled structure on a cross-section of the steel sheet cut along a thickness direction perpendicular to the casting direction. Regions indicated by red dashed lines in (a) of FIG. 4 show the internal structures of middle layers of the first and second steel materials.

Referring to FIG. 4, it is shown that, when double-layer hot-rolling is performed, because shear deformation is caused to the inside of the laminated structure and driving force for dynamic recrystallization is sufficient, a recrystallized hot-rolled structure is exhibited after hot-rolling. Therefore, it may be understood that no preliminary annealing process is required.

Figure 5:
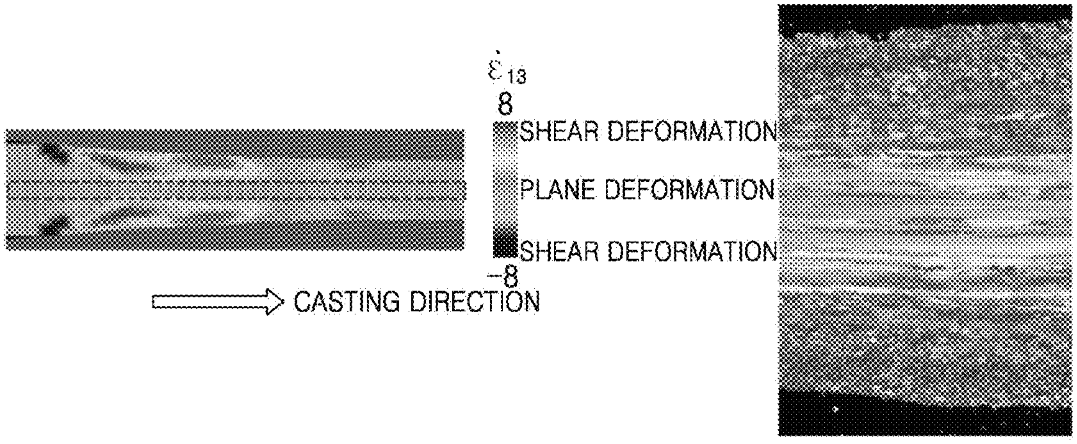
FIG. 5 includes microscopic images of a hot-rolled structure after hot-rolling in Test Example 1 using a method of manufacturing a non-oriented electrical steel sheet, according to a comparative example of the present disclosure.

FIG. 5 includes microscopic images of a hot-rolled structure after hot-rolling in Test Example 1 using a method of manufacturing a non-oriented electrical steel sheet, according to a comparative example of the present invention. (A) of FIG. 5 is a microscopic image of the hot-rolled structure on a cross-section of the steel sheet cut along a length direction parallel to a casting direction, and (b) of FIG. 5 is a microscopic image of the hot-rolled structure on a cross-section of the steel sheet cut along a thickness direction perpendicular to the casting direction. A region indicated by a red dashed line in (a) of FIG. 5 shows the internal structure of a middle layer of the single steel material (single layer).

Referring to FIG. 5, it is shown that, when general single-layer hot-rolling is performed, because shear deformation occurs only at the surface due to the symmetric rolling process while only plane deformation is applied to the internal structure, an elongated casting structure remains in the middle layer due to insufficient driving force for dynamic recrystallization. Therefore, it may be understood that a preliminary annealing process for preventing the above-described casting structure is required.

For a single-layer hot-rolled steel sheet (general process), the {100} plane is developed by performing preliminary annealing to achieve a dynamically recrystallized structure in the internal structure. However, for a double-layer hot-rolled steel sheet (embodiment), dynamic recrystallization occurs in the internal structure of the middle layer of the laminated structure due to the double-layer hot-rolling process and thus preliminary annealing may be omitted.

It is shown that the final product manufactured according to the present invention has a core loss similar to that of the single-layer product obtained by performing preliminary annealing, and also has a magnetic flux density higher than that of the product produced by omitting preliminary annealing (e.g., APL). Therefore, a multilayer (i.e., double-layer) steel sheet may be manufactured more simply compared to existing methods, and a preliminary annealing process may be omitted.

While the present invention has been particularly shown and described with reference to embodiments thereof, it will be understood by one of ordinary skill in the art that various changes in form and details may be made therein without departing from the scope of the present invention as defined by the following claims.

The invention claimed is:

1. A method of manufacturing a non-oriented electrical steel sheet, the method comprising:

hot-rolling each of first and second steel materials containing silicon (Si), manganese (Mn), and aluminum (Al);

laminating the hot-rolled first and second steel materials to form a first laminated structure;

hot-rolling the first laminated structure to form a second laminated structure;

cold-rolling the second laminated structure to form a third laminated structure; and cold-annealing the third laminated structure.

2. The method of claim 1, further comprising removing a scale layer formed on surfaces of the hot-rolled first and second steel materials, after the hot-rolling each of first and second steel materials and before the forming of the first laminated structure.

3. The method of claim 1, wherein the hot-rolling each of first and second steel materials comprises performing roughing under conditions of a slab reheating temperature (SRT): 1000° C. to 1200° C. and a roughing delivery temperature (RDT): 800° C. to 900° C.

4. The method of claim 1, wherein the hot-rolling the first laminated structure comprises performing hot-rolling under conditions of an SRT: 1100° C. to 1200° C., a finishing delivery temperature (FDT): 800° C. to 1000° C., and a coiling temperature (CT): 560° C. to 600° C.

5. The method of claim 1, wherein the hot-rolled first and second steel materials each have a thickness of 100 mm to 150 mm, wherein the hot-rolled second laminated structure has a thickness of 1.6 mm to 2.6 mm, and wherein the cold-rolled third laminated structure has a thickness of 0.25 mm to 0.60 mm.

6. The method of claim 1, wherein the cold-annealing comprises:

performing annealing under conditions of a heating rate: 10° C./s or more, an annealing start temperature: 900° C. to 1100° C., and a holding time: 30 sec. to 90 sec.; and performing cooling under a condition of a cooling rate: 30° C./s or more.

7. The method of claim 1, wherein the first and second steel materials each comprise Si: 2.8 wt % to 3.8 wt %, Mn: more than 0 wt % and not more than 0.5 wt %, Al: 0.5 wt % to 1.2 wt %, carbon (C): more than 0 wt % and not more than 0.002 wt %, phosphorus (P): more than 0 wt % and not more than 0.015 wt %, sulfur (S): more than 0 wt % and not more than 0.002 wt %, nitrogen (N): more than 0 wt % and not more than 0.002 wt %, titanium (Ti): more than 0 wt % and not more than 0.002 wt %, and a balance of iron (Fe) and unavoidable impurities.

8. The method of claim 1, wherein the cold-annealed third laminated structure has a core loss ($W_{10/400}$) of 14.0 W/kg or less and a magnetic flux density ($B_{50}$) of 1.6 T or more.

9. A non-oriented electrical steel sheet comprising a laminated structure of steel materials containing silicon (Si), manganese (Mn), and aluminum (Al), the laminated structure being formed by laminating first hot-rolled first and second steel materials and then sequentially performing second hot-rolling, cold-rolling, and cold-annealing.

10. The non-oriented electrical steel sheet of claim 9, wherein the first and second steel materials each comprise Si: 2.8 wt % to 3.8 wt %, Mn: more than 0 wt % and not more than 0.5 wt %, Al: 0.5 wt % to 1.2 wt %, carbon (C): more than 0 wt % and not more than 0.002 wt %, phosphorus (P): more than 0 wt % and not more than 0.015 wt %, sulfur (S): more than 0 wt % and not more than 0.002 wt %, nitrogen (N): more than 0 wt % and not more than 0.002 wt %, titanium (Ti): more than 0 wt % and not more than 0.002 wt %, and a balance of iron (Fe) and unavoidable impurities.

* * * * *